H. A. DORR.
STORE SERVICE CHECK.
APPLICATION FILED APR. 26, 1920.

1,379,002.

Patented May 24, 1921.
2 SHEETS—SHEET 1.

WITNESS

INVENTOR
Harry A. Dorr
BY
Redding & Greeley
ATTORNEYS

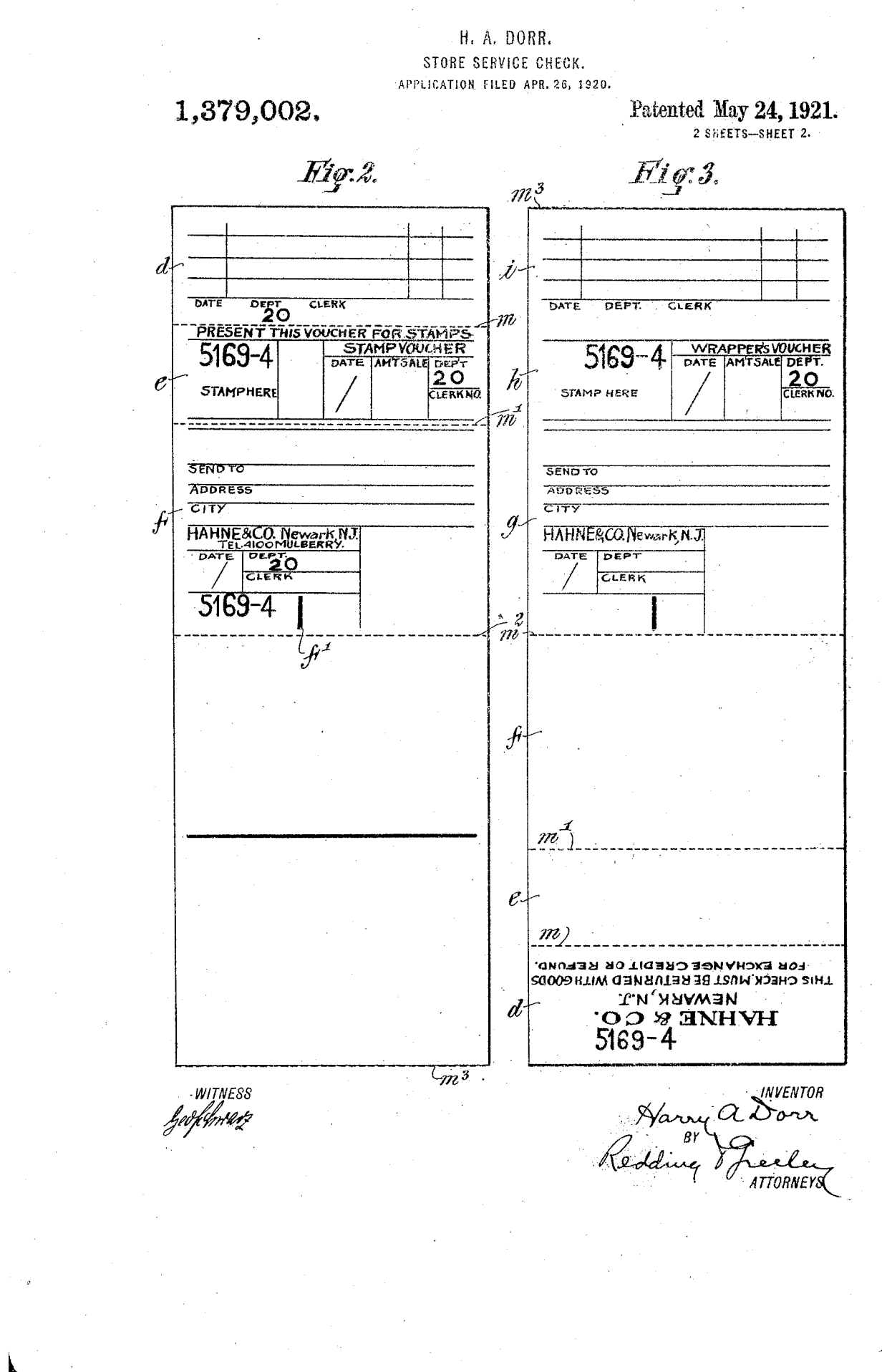

H. A. DORR.
STORE SERVICE CHECK.
APPLICATION FILED APR. 26, 1920.

1,379,002.

Patented May 24, 1921.
2 SHEETS—SHEET 2.

UNITED STATES PATENT OFFICE.

HARRY A. DORR, OF NEWARK, NEW JERSEY, ASSIGNOR TO HAHNE & COMPANY, OF NEWARK, NEW JERSEY, A CORPORATION OF NEW JERSEY.

STORE-SERVICE CHECK.

1,379,002.  Specification of Letters Patent.  Patented May 24, 1921.

Application filed April 26, 1920. Serial No. 376,518.

*To all whom it may concern:*

Be it known that I, HARRY A. DORR, a citizen of the United States, residing in the city of Newark, in the State of New Jersey, have invented certain new and useful Improvements in Store-Service Checks, of which the following is a specification, reference being had to the accompanying drawings, forming a part hereof.

This invention has for its object to provide an improved store service check by which the work of making relatively small retail sales in large retail stores can be facilitated greatly as compared with the procedure heretofore commonly followed, the time of customer and clerk saved, the congestion of tube room and audit department relieved, accuracy and despatch promoted, and suitable receipts or voucher slips furnished for the customer and the several store departments involved. The improved store service check has been developed with special reference to its use in connection with what are known as "paid sent" transactions, that is, sales made for cash and the goods delivered by the store, and to its use also in connection with a credit stamp system, but it is capable of use with other sales systems. It has been designed also with reference to its use in connection with certigraph machines and with recording cash registers, but is also capable of use independently of such means. The improved check will be found particularly useful in transactions which involve not more than four or five items, but its use might be extended to cover a greater number of items if desired. The invention will be explained more fully hereinafter with reference to the accompanying drawings in which it is illustrated and in which—

Fig. 2 is a view of one side of the complete check.

Fig. 3 is a view of the other side of the check.

Figure 1:
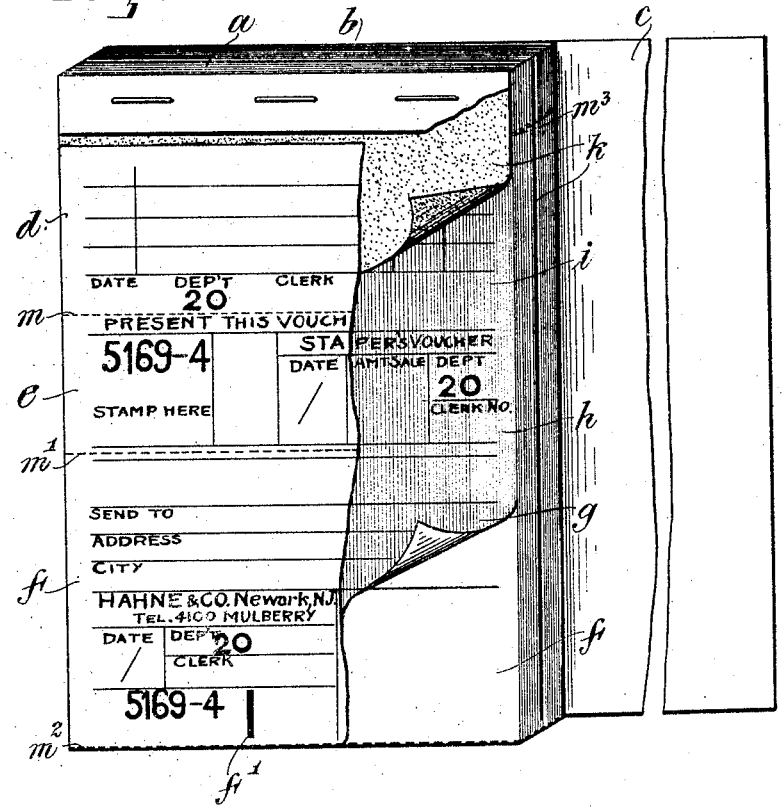
Figure 1 is a view in perspective of a book made up of a considerable number of the improved checks with a carbon sheet for convenience in the making of the duplicate record, some portions being torn away to disclose more clearly other portions.

Each check comprises the following parts:

1. A stub $a$, which is to be used if several checks are to be bound in a book $b$ with a cover $c$, for convenience in use by the sales clerk to whom the book is issued. This stub might be numbered or otherwise marked for identification if desired, but such marking is not contemplated in the ordinary use of the improved check.

2. A slip $d$, which may be called an itemization slip, being ruled for the convenient entry of several sales items, with the amount of each and the total of all, and being marked, if so desired, with the date of use, the department number and the clerk's number. It is also marked, preferably on the reverse side, as shown in Fig. 3, with a check number, successive checks being numbered consecutively. It may have on the reverse side, also, the name of the store with a direction that the check must be returned with goods for exchange, etc.

3. A slip $e$ which, in the present instance, is intended to be used as a credit or trading stamp voucher in a sales system in which the customer, after completing the purchase, hands the slip to a stamp clerk, by whom a credit stamp, proportioned in face value to the total amount of the transaction, is delivered to the customer. This slip bears the check number, shown in this case as imprinted on the face, and may be ruled for the date, the amount of sale, the department number and the clerk's number. This slip may be used for other purposes than as a stamp voucher and will be ruled accordingly.

4. An address slip $f$ ruled to receive the name and address of the customer and bearing on its face the check number and if desired a guide mark $f'$ to guide the clerk in placing the ticket in a certigraph, or a mark differently placed to guide the clerk in placing the ticket in a recording cash register. The slip may also bear the name of the store and be ruled for the date, the department number and the clerk number.

5. A duplicate address slip $g$ which is preferably ruled like the address slip $f$ and may or may not bear the check number. It is ruled in alinement with the address slip $f$ so that when the address slip $f$ is filled out a duplicate record thereof shall be made, by means of the carbon sheet $k$, on the duplicate slip.

6. A duplicate slip $h$ which bears the check number and may be ruled like the credit stamp voucher $e$, but is intended to serve as a wrapper's voucher. This is adapted to receive, through the carbon sheet, a duplicate of the entries on the stamp voucher.

7. A duplicate $i$ of the itemization slip $d$, ruled like the itemization slip and adapted to receive thereon a carbon duplicate of the entry on the itemization slip $d$.

The several slips are defined by perforated lines or scored lines, as indicated at $m$, $m'$, etc., and the whole ticket is folded over on the line $m^2$ so as to receive the carbon sheet $k$ between the two parts. The duplicate part of the whole check, comprising the slips $g$, $h$ and $k$, which receives the duplicate entries through the carbon sheet, is printed on the opposite side from the portion of the sheet which comprises the slips $d$, $e$ and $f$. Preferably also the slips $d$, $e$ and $f$ are printed in one color, as black, and the slips $g$, $h$ and $i$ are printed in a different color, as red, in order that confusion as between the original and duplicate of any slip shall be avoided. It will be understood that in the arrangement shown in the drawings the stub $a$ is connected to the slip $i$ and that when the entries have been made on the face of the slips $d$, $e$ and $f$ and the carbon sheet has been removed from between the two parts of the check, the check is detached from the stub by tearing on the line $m^3$.

When the proper entries have been made on the check and the check detached from the binder the clerk first introduces the ticket into the certigraph or the recording cash register, if one is used, and operates the machine or register so that, in the case of the certigraph, the address slip shall be stamped with the date and amount, or, in the case of the recording cash register, both the credit stamp voucher and the address slip shall be stamped with the date, amount, etc.

When the ticket has thus been filled out, detached and stamped, the item slip $d$ and the stamp voucher $e$ are detached together by the clerk and handed to the customer with the statement "this is your receipt." The customer takes the item slip $d$ and the stamp slip $e$ to the stamp clerk, who detaches the stamp slip or voucher, hands the proper credit stamps to the customer and retains the stamp slip as his voucher, having stamped or marked it to show that the stamps have been issued. The customer retains the item slip $d$ and, in case of a desire for exchange, credit or refund, or in case of any complaint, is enabled to identify the transaction by the check number on the back of the item slip.

Whether stamps are used or not, the slip $e$ goes eventually to the cashier's department as a counter check on the transaction.

After the item slip $d$ and check slip $e$ have been removed the remainder of the check, with all of its parts, including the address slip intact, goes with the goods from the sales clerk to the wrapper, who wraps articles which are small and not easily broken, or to the packer, who packs articles which are large or easily broken. The wrapper affixes, with paste, the address slip $f$ to the completed package or the packer affixes, with paste, the address slip to a tag to be fastened to the merchandise, in either case the duplicate slips $g$, $h$ and $i$ still remaining attached to the address slip $f$. The merchandise then goes to the delivery department, being inspected on its way by the tally clerk, and in the delivery department the duplicate part of the check is detached from the address label, and is stamped with the route number and the date. The duplicate check as a whole may then be sent to the complaint department to be placed on file or it may be separated and the parts distributed as the system in vogue where the check is used may require.

It will be noted that the duplicate of the item slip remains attached to the merchandise until it reaches the delivery department, so that the wrapper or packer, the tally clerk and the delivery clerk have an opportunity to check up the parcel, by the wrapper or packer in detail and by the tally clerk and delivery clerk as a whole, with the duplicate item slip.

The use of the improved check facilitates the completion of each transaction as between the customer and the sales clerk, saving the time of both, avoids waste of time on the part of wrapper or packer in opening a carrier and in waiting for an address slip or label, relieves pressure in the tube room and the audit department by making it unnecessary to send sale slips with not more than four or five items to the tube room and audit department prior to packing the goods sold for delivery, promotes accuracy, gives every handler of the merchandise a check, and furnishes the customer with a ready means of identification in case of error or a desire for exchange, credit or refund.

I claim as my invention:

1. A store service check comprising, in separable portions appropriately designated and each identified by a check number and arranged in the order named, first, at the free end an item slip for the customer, with a weakened line between it and the other portions of the check to permit it to be separated therefrom at the time of sale, a stamp voucher slip normally continuous with the item slip with a weakened line between it and the item slip and between it and the other portions of the check, an address slip adapted to be attached to the package containing the goods normally continuous with the stamp voucher slip, and a carbon duplicate portion folded to underlie said item slip, stamp voucher slip and address slip and adapted to receive a duplicate of the entries thereon, the address slip and carbon duplicate portion being normally continuous to permit them to be forwarded without separation with the goods to be packed for delivery.

2. A store service check comprising in separable portions appropriately designated and each identified by a check number and arranged in the order named, first, at the free end an item slip for the customer, with a weakened line between it and the other portions of the check to permit it to be separated therefrom at the time of sale, a stamp voucher slip normally continuous with the item slip, with a weakened line between it and the item slip and between it and the other portions of the check, an address slip adapted to be attached to the package containing the goods normally continuous with stamp voucher slip, and a carbon duplicate portion folded to underlie said item slip, stamp voucher slip and address slip and adapted to receive duplicates of the entries thereon, having the portion thereof underlying the stamp voucher slip appropriately designated to serve as a wrapper's voucher, the address slip and carbon duplicate portion being normally continuous to permit them to be forwarded without separation with the goods to be packed.

This specification signed this 14th day of April, A. D. 1920.

HARRY A. DORR.